United States Patent [19]

Roberts et al.

[11] Patent Number: 4,980,121
[45] Date of Patent: Dec. 25, 1990

[54] PROTECTIVE DEVICE FOR LOWER END PORTION OF A NUCLEAR FUEL ROD CLADDING

[75] Inventors: Elwyn Roberts, Lugoff; Warren L. Mauterer, Columbia, both of S.C.; Harry M. Ferrari, Fox Chapel; Robert N. Stanutz, Monroeville, both of Pa.

[73] Assignee: Westinghouse Electric Corp., Pittsburgh, Pa.

[21] Appl. No.: 386,065

[22] Filed: Jul. 28, 1989

[51] Int. Cl.⁵ .................... G21C 3/34; G21C 19/00
[52] U.S. Cl. .................... 376/439; 376/313; 376/440; 376/442
[58] Field of Search .......... 376/352, 313, 440, 442, 376/441, 439, 435

[56] References Cited

U.S. PATENT DOCUMENTS

| | | | |
|---|---|---|---|
| Re. 30,065 | 8/1979 | Anthony et al. | 376/435 |
| 2,879,216 | 3/1959 | Horwitz et al. | 204/193.2 |
| 3,791,466 | 2/1974 | Patterson et al. | 376/442 |
| 3,920,516 | 11/1975 | Kmonk et al. | 376/442 |
| 3,954,560 | 5/1976 | Delafosse et al. | 376/442 |
| 4,056,441 | 11/1977 | Marmonier et al. | 376/442 |
| 4,147,591 | 4/1979 | Miki | 176/81 |
| 4,172,761 | 10/1979 | Raven et al. | 376/442 |
| 4,239,597 | 12/1980 | Christiansen | 176/78 |
| 4,372,817 | 2/1983 | Armijo et al. | 376/417 |
| 4,391,771 | 7/1983 | Anthony | 376/451 |
| 4,420,458 | 12/1983 | Dunlap et al. | 376/447 |
| 4,445,942 | 5/1984 | Cheng et al. | 148/6.3 |
| 4,541,984 | 9/1985 | Palmer | 376/415 |
| 4,606,109 | 8/1986 | Weiss | 29/421 R |
| 4,664,881 | 5/1987 | Ferrari et al. | 376/410 |
| 4,675,154 | 6/1987 | Nelson et al. | 376/439 |
| 4,692,303 | 9/1987 | Osborne | 376/442 |
| 4,717,534 | 1/1988 | Morita | 376/419 |
| 4,718,949 | 4/1988 | Takase et al. | 148/11.5 F |
| 4,728,488 | 3/1988 | Gilett et al. | 376/327 |
| 4,751,044 | 6/1988 | Hwang et al. | 376/416 |
| 4,769,210 | 9/1988 | Campbell | 376/448 |
| 4,792,428 | 12/1988 | Canat et al. | 376/440 |
| 4,849,161 | 7/1989 | Brown et al. | 376/439 |

FOREIGN PATENT DOCUMENTS 0162985  8/1985  Japan .................... 376/352

Primary Examiner—Harvey E. Behrend

[57] ABSTRACT

A nuclear fuel assembly having an array of longitudinally extending fuel rods and axially spaced transverse grids with cells receiving the fuel rods therethrough employs anti-fretting protective devices for protecting lower end portions of tubular claddings of the fuel rods from damage-inducing contact with debris entrained in upward flow of coolant through the fuel assembly. Each device is in the form of a hollow sleeve disposed about and extending coextensive with the lower end portion of one fuel rod cladding. The sleeve has an upper portion which extends through one grid cell between lower and upper ends thereof, and a lower portion which extends below the grid cell from the lower end thereof to a bottom end of the fuel rod cladding spaced below the grid cell lower end.

10 Claims, 3 Drawing Sheets

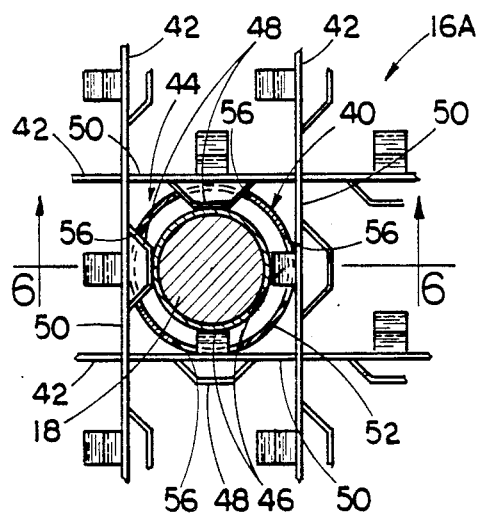
FIG. 5
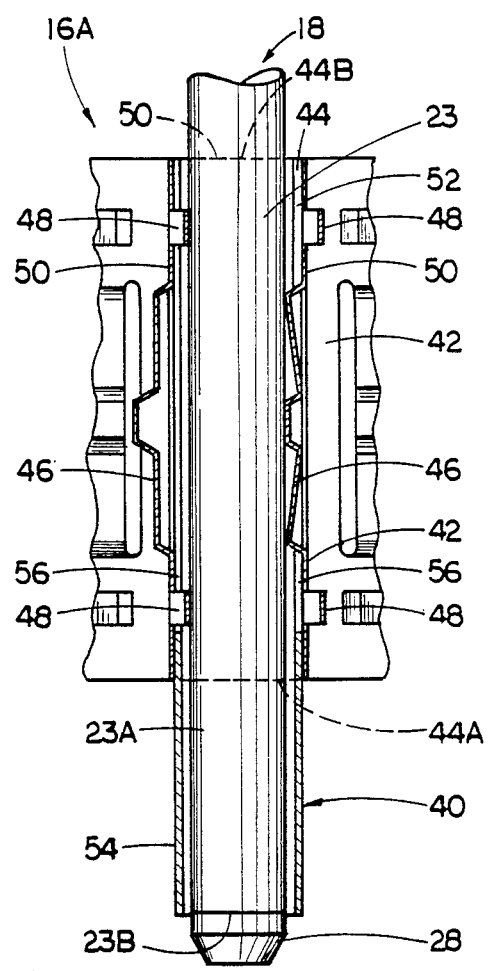
FIG. 6
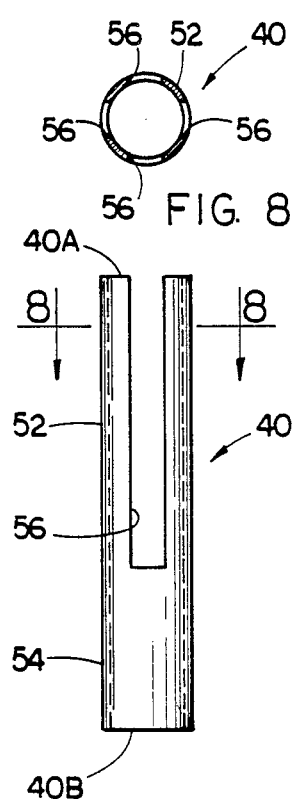
FIG. 8
FIG. 7
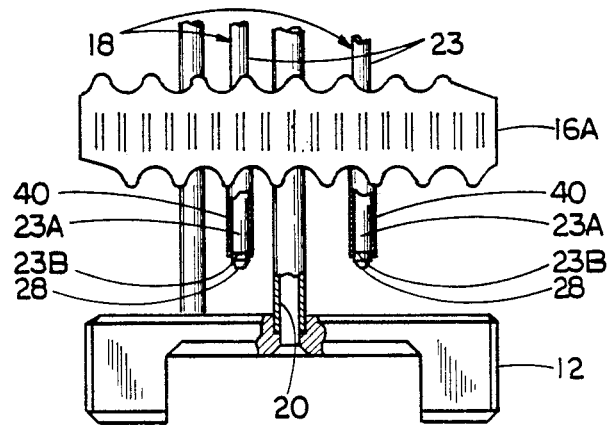
FIG. 9

PROTECTIVE DEVICE FOR LOWER END PORTION OF A NUCLEAR FUEL ROD CLADDING

BACKGROUND OF THE INVENTION

1. Field of the Invention

The present invention relates generally to nuclear fuel assemblies and, more particularly, is concerned with a device in the form of a sleeve for protecting a lower end portion of a nuclear fuel rod cladding from debris-induced fretting damage.

2. Description of the Prior Art

During manufacture and subsequent installation and repair of components comprising a nuclear reactor coolant circulation system, diligent effort is made to help assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the systems. Most of the debris consists of metal turnings which were probably left in the primary system after steam generator repair or replacement.

In particular, fuel assembly damage due to debris trapped at the lowermost grid has been noted in several reactors in recent years. Debris enters through the fuel assembly bottom nozzle flow holes from the coolant flow openings in the lower core support plate when the plant is started up. The debris tends to become lodged in the lowermost support grid of the fuel assembly within the spaces between the "egg-crate" shaped cell walls of the grid and the lower end portions of the fuel rod tubes. The flowing coolant causes the debris to gyrate which tends to cut through the cladding of the fuel rod. Thus, the damage consists of fuel rod cladding perforations caused by fretting of debris in contact with the exterior of the fuel rod.

One basic approach to solving this problem of debris-induced damage to fuel rods has been to devise a debris filter or trap in the region of the bottom nozzle of the fuel assembly. Although certain designs of debris filters do function to prevent a significant percent of the debris from reaching the region of the lowermost grid, some debris still gets through and can cause fretting failures.

Consequently, a need still exists for a fresh approach to avoidance of debris-induced damage of nuclear fuel rods. The new approach must be compatible with the existing structure and operation of the components of the reactor, be effective throughout the operating cycle of the reactor, and at least provide overall benefits which outweigh the costs it adds to the reactor.

SUMMARY OF THE INVENTION

The present invention provides a protective device for nuclear fuel rod cladding which is designed to satisfy the aforementioned needs. The approach of the present invention does not involve filtering or trapping debris, but rather involves protecting the surfaces of the fuel rod claddings in the critical locations where fretting damage is a problem from contact with the debris. Particularly, the protective device of the present invention protects the lower end portion of the fuel rod cladding from damage-inducing contact with debris entrained in the upward coolant flow through the grid cell.

The protective device of the present invention is employed in a nuclear fuel assembly having an fuel rod extending along an upward flow of coolant through the fuel assembly and a grid extending transversely to the upward coolant flow. The grid has a cell which receives a portion of the upward coolant flow therethrough from a lower end to an upper end of the cell. The fuel rod has a tubular cladding with a lower end portion thereof extending through the grid cell from the upper end downwardly past the lower end to a bottom end of the cladding spaced below the lower end of the cell.

The protective device of the present invention is in the form of a hollow sheath or sleeve disposed about and extending coextensive with the lower end portion of the fuel rod cladding so as to shield the same from contact by debris entrained in the upward coolant flow and thereby avoid fretting of the lower end portion thereof. More particularly, the sleeve has an upper portion which extends through the grid cell between the lower and upper ends thereof, and a lower portion which extends below the grid cell from the lower end thereof to the bottom end of the fuel rod cladding. The upper portion of the sleeve has circumferentially-spaced and axially-extending slots defined therein which permit projecting of fuel rod engaging elements on the walls of the cell through the slots and into engagement with the lower end portion of the fuel rod cladding extending through the cell.

Further, the sleeve is separate from the lower end portion of the fuel rod cladding and attached to the grid cell, such as by brazing or welding. The fuel rod has a lower end plug attached to the bottom end of the cladding, and the sleeve has a lower edge which is disposed at the level of the bottom end of the cladding such that the lower end plug of the fuel rod extends below the lower edge of the sleeve. Also, the upper edge of the sleeve is disposed at the level of the upper end of the grid cell.

Preferably, the sleeve has a wall thickness greater than the wall thickness of the fuel rod cladding. Additionally, the sleeve has a material hardness greater than the material hardness of the fuel rod cladding.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is a fragmentary plan view similar to that of FIG. 2, but with the protective device and fuel rod installed in a cell of the grid.

FIG. 6 is a fragmentary axial sectional view taken along line 6—6 of FIG. 5.

FIG. 7 is an enlarged side elevational view of the protective device of the present invention by itself.

FIG. 8 is a cross-sectional view of the protective device taken along line 8—8 of FIG. 7.

FIG. 9 is a side elevational view of the lower end portion of the fuel assembly of FIG. 1 with all but a few components thereof being omitted.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
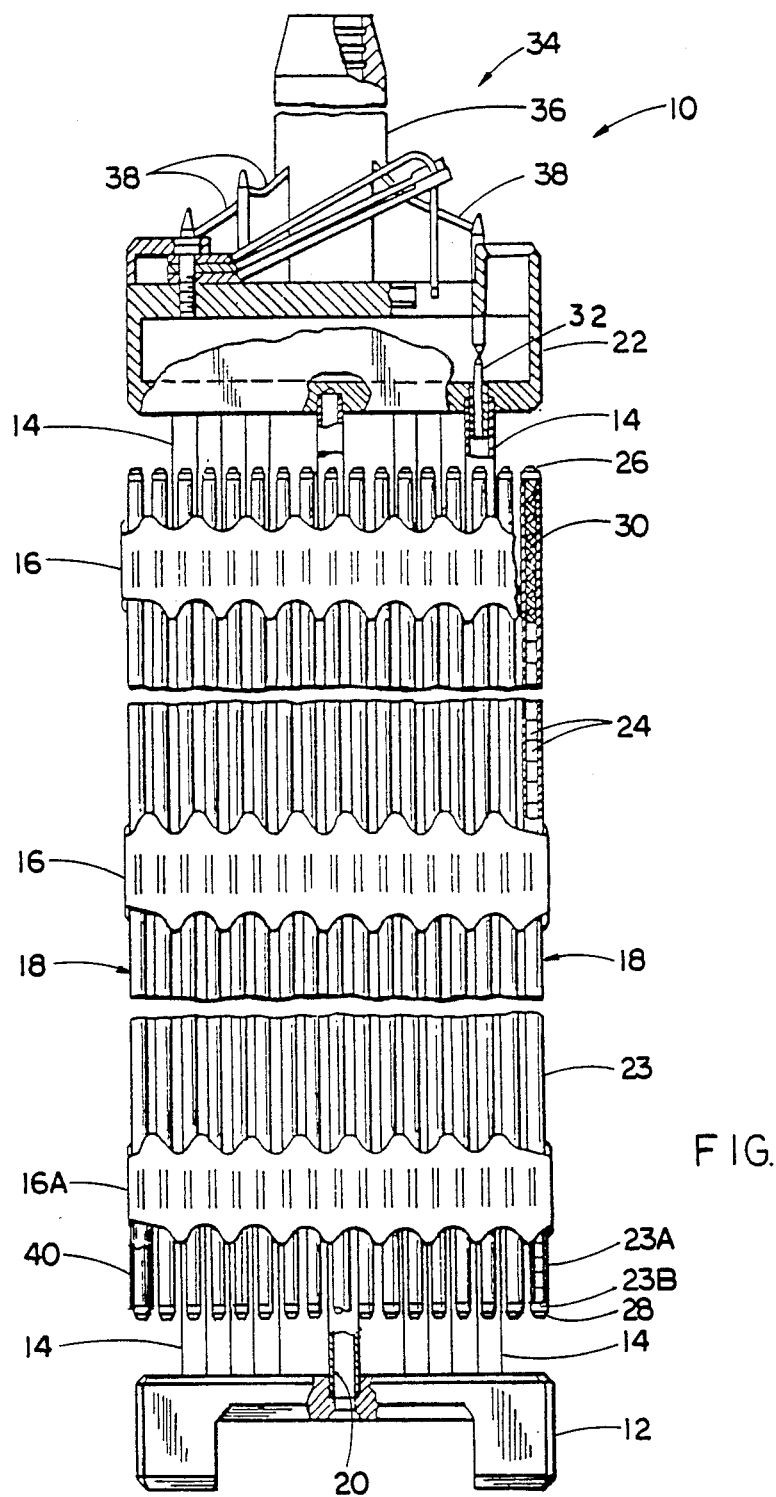
FIG. 1 is a side elevational view, with parts partially sectioned and broken away for purposes of clarity, of a nuclear fuel assembly incorporating anti-fretting protective devices in accordance with the present invention.

Referring now to the drawings, and particularly to FIG. 1, there is shown an elevational view of a nuclear reactor fuel assembly, represented in vertically foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes an outer tubular cladding 23 containing a plurality of nuclear fuel pellets 24 and closed at its opposite ends by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Anti-Fretting Protective Device of the Present Invention

As mentioned above, fuel rod damage due to debris trapped at a lowermost one 16A of the grids 16 has been noted in several reactors in recent years. The particles of debris are vibrated by the upward flow of coolant through the fuel assembly 10. As the vibration occurs, the particles may wear a hole through the cladding 23 of a fuel rod 18, causing failure. The goal of the present invention is to protect the fuel rod claddings 23 at the location of the lowermost grid 16A from contact with the debris by the use of grid-mounted protective devices 40 which extend over the lower end portions 23A of the fuel rod claddings 23. However, before describing the invention in detail, the construction of the lowermost grid 16A (which is identical to the other grids) will be briefly described.

Figure 2:
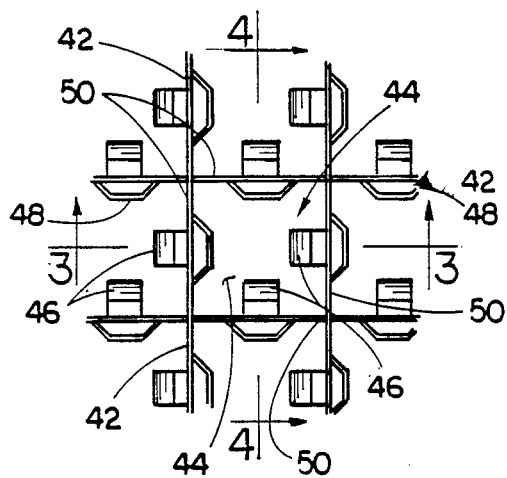
FIG. 2 is an enlarged fragmentary plan view of one of the fuel rod support grids of the fuel assembly of FIG. 1, such as the lowermost one of the grids.
Figures 3, 4:
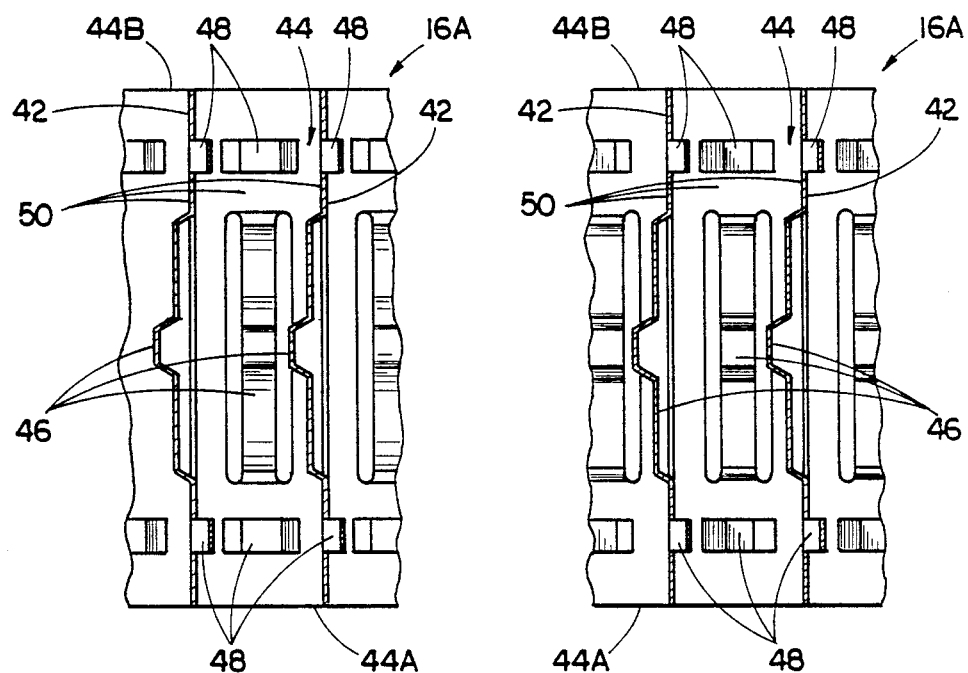
FIG. 3 is a fragmentary axial sectional view of the grid taken along 3—3 of FIG. 2.
FIG. 4 is another fragmentary axial sectional view of the grid taken along line 4—4 of FIG. 2.

Turning to FIGS. 2-4, it is seen that the grid 16A includes a multiplicity of interleaved inner straps 42 having an egg-crate configuration designed to form cells, indicated as 44, a majority of which individually accept one fuel rod 18 and a minority of which accept one control rod guide thimble 14. The upward flow of coolant through the fuel assembly 10 goes through the cells 44 of the grid 16A, entering at their lower ends 44A and exiting at their upper ends 44B. The cells 44 of the grid 16A which accept and support the fuel rods 18 at an axial location therealong spaced a short distance above the lower end plugs 28 thereof typically use relatively resilient springs 46 and relatively rigid protrusions or dimples 48 formed into the metal of the interleaved inner straps 42 to generate the spring forces needed to hold the fuel rods therein. Also, the inner straps 42 are generally flexible such that they bow somewhat when the fuel rods 18 are disposed through the grid cells 44.

In the illustrated embodiment of the grid 16A, there are two springs 46 on two adjacent walls 50 of each cell 44 containing a fuel rod 18 and two dimples 48 on each of two adjacent walls 50 of the cell facing each spring 46. The springs 46 and dimples 48 of each grid cell 44 frictionally engage or contact the respective fuel rod 18 extending through the cell.

Referring to now FIGS. 5-9, each of the anti-fretting protective devices 40 of the present invention is in the form of a hollow tubular sheath or sleeve. The hollow sleeve 40 is disposed about and extends coextensive with the lower end portion 23A of the fuel rod cladding 23 so as to shield the same from contact by debris entrained in the upward coolant flow and thereby avoid fretting of the lower end portion 23A thereof.

More particularly, the sleeve 40 has an upper portion 52 which extends through one of the grid cells 44 between the lower and upper ends 44A, 44B thereof, and a lower portion 54 which extends below the grid cell 44 from the lower end 44A thereof to the bottom end 23b of the fuel rod cladding 23. The upper portion 52 of the sleeve 40 has circumferentially-spaced and axially-extending slots 56 defined therein, preferably four in number and displaced ninety degrees from one another. The slots 56 permit extension of the fuel rod engaging springs 46 and dimples 48 from the walls 50 of the cell 44 through the slots 56 and into engagement with the lower end portion 23A of the fuel rod cladding 23 extending through the cell 44. The slots 56 in the sleeve upper portion 52 are open at an upper edge 40A of the sleeve 40. The sleeve 40 is separate from the lower end portion 23A of the fuel rod cladding 23. The sleeve 40 is mounted to the grid 16A by being attached to the grid cell walls 50, such as by brazing or welding. As seen in FIGS. 5 and 6, the separate hollow sleeve 40 surrounds and extends coaxial with the lower end portion 23A of the fuel rod cladding 23 but has a larger diameter such that the sleeve 40 is spaced radially outward from the lower end portion 23A.

As mentioned previously, the lower end plug 28 of the fuel rod 18 is rigidly attached to the bottom end 23B of the cladding 23. The sleeve 40 which is coextensive with the lower end portion 23A of the cladding 23 has a lower edge 40B disposed at the level of the bottom end 23B of the cladding 23 such that the lower end plug 28 of the fuel rod 18 extends below the lower edge 40B of the sleeve 40, as seen in FIGS. 6 and 9. In such position of the sleeve lower edge 40B spaced above the bottom nozzle 12 of the fuel assembly 10, the sleeve 40 does not interfere with or impede the distribution of upward coolant flow from the bottom nozzle 12 upwardly along and between the fuel rods 18. Also, the upper edge 40A of the sleeve 40 is disposed at the level of the upper end 44B of the grid cell 44.

Preferably, the sleeve 40 has a wall thickness greater than the wall thickness of the fuel rod cladding 23, for example twice as great. Additionally, the sleeve 40 can be made of a material such as Inconel having a greater hardness than the material of the fuel rod cladding, such as Zircaloy.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a nuclear fuel assembly for receiving an upward flow of coolant therethrough and including an elongated fuel rod extending along the upward coolant flow and a grid extending transverse thereto, said grid being composed of interleaved walls disposed in an egg-crate configuration and having upper and lower opposite ends defining at least one cell extending therebetween which receives a portion of the upward coolant flow therethrough said fuel rod having a tubular cladding with a lower end portion thereof extending through said grid cell from said upper ends of said grid cell walls downwardly past said lower ends of said grid cell walls to a bottom end of said cladding spaced below said lower ends of said grid cell walls, said tubular cladding lower end portion being spaced radially inwardly at an exterior surface thereof from said grid cell walls, and anti-fretting protective device comprising:

(a) a hollow sleeve disposed about and separate from said lower end portion of said fuel rod cladding of said fuel rod and attached to said cell walls of said grid, said separate sleeve having a larger diameter than said fuel rod cladding lower end portion such that said sleeve is spaced radially outward from said lower end portion, said separate sleeve extending coaxial and coextensive with said lower end portion of said fuel rod cladding so as to shield the sam from contact by debris entrained in the upward coolant flow and thereby avoid fretting of said lower end portion of said fuel rod cladding;

(b) said sleeve having an upper portion which extends through said grid ell between said lower and upper ends of said grid cell walls, said upper portion of said sleeve having an upper edge being disposed approximately at the level of said upper end of said grid cell walls, said upper portion of said sleeve being attached to said grid cell walls;

(c) said sleeve also having a lower potion which extends below said grid cell from said lower end of said grid cell walls to said bottom end of said fuel rod cladding.

2. The fuel assembly as recited in claim 1, wherein:
said fuel rod has a lower end plug attached to said bottom end of said cladding; and
said sleeve of said protective device has a lower edge which is disposed at the level of said bottom end of said cladding such that said lower end plug of said fuel rod extends below said lower edge of said sleeve.

3. The fuel assembly as recited in claim 1, wherein said sleeve of said protective device has a wall thickness greater than the wall thickness of said fuel rod cladding.

4. The fuel assembly as recited in claim 1, wherein said sleeve of said protective device has a material hardness greater than the material hardness of said fuel rod cladding.

5. In a nuclear fuel assembly for receiving an upward flow of coolant therethrough and including an array of elongated fuel rods extending along the upward coolant flow and at least one support grid extending transverse thereto, said grid being composed of interleaved walls in an egg-crate configuration and having upper and lower opposite ends defining a plurality of cells extending therebetween which each receives a portion of the upward coolant flow therethrough each fuel rod including a tubular cladding having a lower end portion extending through one of said grid cells from said upper ends of said grid cell walls downwardly past said lower ends of said grid cell walls to a bottom end of said cladding spaced below said lower ends of said grid cell walls, said tubular cladding lower end portion being spaced radially inwardly at an exterior surface thereof from said grid cell walls, each grid cell having a plurality of fuel rod engaging elements on said walls thereof which project therefrom into engagement with said lower end portion of said cladding of the one fuel rod extending through said cell, a plurality of anti-fretting protective devices, each of said devices comprising:

(a) a hollow sleeve disposed about and separate from said lower end portion of said fuel rod cladding of each of said fuel rods and attached to said walls of said each grid cell, said separate sleeve having a larger diameter than said fuel rod cladding lower end portion such that said sleeve is spaced radially outward from said lower end portion, said separate sleeve extending coaxial and coextensive with said lower end portion of said fuel rod cladding so as to shield the same from contact by debris entrained in the upward coolant flow and thereby avoid fretting of said lower end portion of said fuel rod cladding;

(b) said sleeve having an upper portion which extends through said grid cell between said lower and upper ends of said grid cell walls, said upper portion of said sleeve having an upper edge being disposed approximately at the level of said upper end of said grid cell walls, said upper portion of said sleeve being attached to said grid cell walls;

(c) said sleeve also having a lower portion which extends below said grid cell walls from lower end of said grid cell walls to said bottom end of said fuel rod cladding.

6. The fuel assembly as recited in claim 5, wherein:

said fuel rod has a lower end plug attached to said bottom end of said cladding; and said sleeve of said protective device has a lower edge which is disposed at the level of said bottom end of said cladding such that said lower end plug of said fuel rod extends below said lower edge of said sleeve.

7. The fuel assembly as recited in claim 5, wherein said sleeve of said protective device has a wall thickness greater than the wall thickness of said fuel rod cladding.

8. The fuel assembly as recited in claim 6, wherein said sleeve of said protective device has a material hardness greater than the material hardness of said fuel rod cladding.

9. The fuel assembly as recited in claim 6, wherein said upper portion of said sleeve of said protective device has circumferentially-spaced and axially-extending slots defined therein which permit projecting of said engaging elements on said walls of said cell into engagement with said lower end portion of said cladding of the one fuel rod extending through said cell.

10. The fuel assembly as recited in claim 9, wherein said slots in said sleeve upper portion are open at an upper edge of said sleeve.

* * * * *